United States Patent
Hori et al.

(10) Patent No.: US 9,627,697 B2
(45) Date of Patent: Apr. 18, 2017

(54) SOLID OXIDE FUEL CELL, FUEL CELL STACK SYSTEM, FUEL CELL MODULE, AND FUEL CELL SYSTEM

(75) Inventors: Yuuichi Hori, Kirishima (JP); Akihiro Hara, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 456 days.

(21) Appl. No.: 14/119,767

(22) PCT Filed: May 29, 2012

(86) PCT No.: PCT/JP2012/063716
§ 371 (c)(1),
(2), (4) Date: Nov. 22, 2013

(87) PCT Pub. No.: WO2012/165409
PCT Pub. Date: Dec. 6, 2012

(65) Prior Publication Data
US 2014/0080029 A1    Mar. 20, 2014

(30) Foreign Application Priority Data

May 30, 2011    (JP) .................................. 2011-120649

(51) Int. Cl.
| | | |
|---|---|---|
| *H01M 8/02* | (2016.01) | |
| *H01M 8/0276* | (2016.01) | |
| *H01M 8/1246* | (2016.01) | |
| *H01M 8/2425* | (2016.01) | |
| *H01M 8/243* | (2016.01) | |
| *H01M 8/0282* | (2016.01) | |
| *H01M 8/0204* | (2016.01) | |
| *H01M 8/124* | (2016.01) | |
| *H01M 8/2475* | (2016.01) | |
| *H01M 8/04082* | (2016.01) | |

(52) U.S. Cl.
CPC ....... *H01M 8/0276* (2013.01); *H01M 8/0204* (2013.01); *H01M 8/0282* (2013.01); *H01M 8/1246* (2013.01); *H01M 8/243* (2013.01); *H01M 8/2425* (2013.01); *H01M 8/04201* (2013.01); *H01M 8/2475* (2013.01); *H01M 2008/1293* (2013.01); *Y02E 60/525* (2013.01); *Y02P 70/56* (2015.11)

(58) Field of Classification Search
CPC .. H01M 8/1246; H01M 8/2425; H01M 8/243; H01M 8/0282; H01M 8/0276; H01M 8/0204; H01M 2008/1293; H01M 8/2475; H01M 8/04201; Y02E 60/521; Y02P 70/56

See application file for complete search history.

(56) References Cited

U.S. PATENT DOCUMENTS

| | | | |
|---|---|---|---|
| 6,316,136 B1 | 11/2001 | Batawi | |
| 2003/0224240 A1* | 12/2003 | Yamashita | .......... H01M 8/1226 429/465 |
| 2008/0145711 A1* | 6/2008 | Fujimoto | ............ H01M 4/8605 429/465 |
| 2010/0233567 A1* | 9/2010 | Larsen | ...................... C03C 8/24 429/469 |
| 2012/0251922 A1* | 10/2012 | Finnerty | ............... C04B 38/103 429/484 |

FOREIGN PATENT DOCUMENTS

| | | |
|---|---|---|
| JP | H02170370 A | 7/1990 |
| JP | H03274673 A | 12/1991 |
| JP | 6-283179 | 10/1994 |
| JP | 2004-146334 | 5/2004 |

OTHER PUBLICATIONS

Extended European Search Report dated Oct. 7, 2014 issued in the corresponding European patent application No. 12793143.4.
English Translation of International Search Report issued in PCT/JP2012/063716 dated Jun. 20, 2012.

* cited by examiner

*Primary Examiner* — Muhammad Siddiquee
(74) *Attorney, Agent, or Firm* — Viering, Jentschura & Partner mbB

(57) ABSTRACT

A solid oxide fuel cell having an electric power generating element unit that is configured by sandwiching a solid electrolyte layer between a fuel electrode layer and an oxygen electrode layer with a pore that is present in the solid electrolyte layer and is covered with a sealing material. In addition, a pore that is present in an interconnector, which is electrically connected to the fuel electrode layer or the oxygen electrode layer, is covered with the sealing material. Consequently, the solid oxide fuel cell is capable of easily preventing gas leakage.

11 Claims, 8 Drawing Sheets

SOLID OXIDE FUEL CELL, FUEL CELL STACK SYSTEM, FUEL CELL MODULE, AND FUEL CELL SYSTEM

CROSS-REFERENCE TO RELATED APPLICATIONS

This application is a national phase of the International application PCT/JP2012/063716 filed May 29, 2012 that claims priority from the Japanese patent application JP2011-120649 filed May 30, 2011. The content of these aforementioned documents is herewith incorporated by reference.

TECHNICAL FIELD OF THE INVENTION

The present invention relates to a solid oxide fuel cell including a power-generating element unit composed of a fuel electrode layer, an oxygen electrode layer, and a solid electrolyte layer sandwiched therebetween; a fuel cell stack device; a fuel cell module; and a fuel cell apparatus.

BACKGROUND OF THE INVENTION

Solid oxide fuel cells each include a power-generating element unit composed of a fuel electrode layer, an oxygen electrode layer, and a solid electrolyte layer sandwiched therebetween.

A solid oxide fuel cell is configured as follows: for example, such a power-generating element unit is formed on an electrically conductive support which is porous and which has gas channels extending therein, an interconnector is formed on the electrically conductive support that is free from the solid electrolyte layer, and the electrically conductive support is surrounded by the solid electrolyte layer and the interconnector.

Hydrogen is supplied to a fuel electrode layer from the electrically conductive support by feeding a fuel gas (for example, a hydrogen gas) through the gas channels in the electrically conductive support while oxygen is supplied to an oxygen electrode layer by feeding an oxygen-containing gas such as air to an outer surface of the oxygen electrode layer. This causes an electrode reaction on each electrode. The current generated thereby is extracted using the interconnector placed on the electrically conductive support (for example, Patent Literature 1).

Each of cell stacks is configured by connecting a plurality of such fuel cells to each other in series. The cell stacks are housed in a storage vessel and are connected to each other through electrically conductive members, whereby a fuel cell module is configured.

The following is a list of the aforementioned background art
PTL 1: Japanese Unexamined Patent Application Publication No. 2004-146334

However, in the conventional fuel cell disclosed in Japanese Unexamined Patent Application Publication No. 2004-146334, the solid electrolyte layer and the interconnector need to be dense because the electrically conductive support is surrounded by the solid electrolyte layer and the interconnector such that the fuel gas supplied into the electrically conductive support does not leak out. In addition, in flat and cylindrical fuel cells, solid electrolyte layers and interconnectors need to be dense such that fuel gases supplied to electrically conductive supports do not leak out. In order to prepare such a dense solid electrolyte layer and interconnector, the agglomeration of raw materials needs to be prevented, the raw materials need to be controlled by reducing dust and impurities, and, furthermore, manufacturing steps need to be strictly controlled. Thus, there is a problem in that it takes time and manpower to prevent gas from leaking from a solid electrolyte layer or an interconnector.

It is an object of the present invention to provide a solid oxide fuel cell capable of readily preventing the leakage of gas, a fuel cell stack device, a fuel cell module, and a fuel cell apparatus.

SUMMARY OF THE INVENTION

A solid oxide fuel cell according to the present invention includes a power-generating element unit composed of a fuel electrode layer, an oxygen electrode layer, and a solid electrolyte layer sandwiched therebetween. Holes present in the solid electrolyte layer are blocked with a sealant.

A solid oxide fuel cell according to the present invention includes a power-generating element unit which is configured with a fuel electrode layer and an oxygen electrode layer sandwiching a solid electrolyte layer and an interconnector electrically connected to the fuel electrode layer or oxygen electrode layer of the power-generating element unit. Holes present in the interconnector are blocked with a sealant.

A fuel cell stack device according to the present invention is made by arranging a plurality of the solid oxide fuel cells. The solid oxide fuel cells are electrically connected to each other.

A fuel cell module according to the present invention includes the fuel cell stack device are housed in at storage vessel.

A fuel cell apparatus according to the present invention includes the fuel cell module, an auxiliary device for operating the fuel cell module housed in at cover case.

Advantageous Effects of Invention

In a solid oxide fuel cell according to the present invention, holes present in a solid electrolyte layer or an interconnector are blocked with a sealant and therefore the leakage of gas from the holes can be readily prevented. This allows a fuel cell stack device, fuel cell module, and fuel cell apparatus having good long-term reliability to be obtained.

BRIEF DESCRIPTION OF DRAWINGS

FIG. 2(b) is an enlarged plan view illustrating a portion of a sealant and the vicinity thereof.

DETAILED DESCRIPTION OF THE DRAWINGS EMBODIMENTS

Figure 1A:
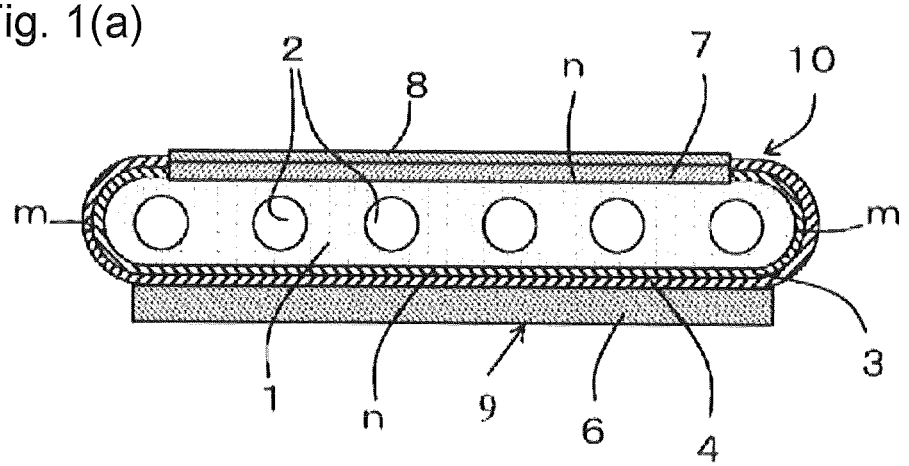
FIG. 1(a) is a horizontal sectional view of a solid oxide fuel cell and FIG. 1(b) is a vertical sectional view thereof.
Figure 1B:
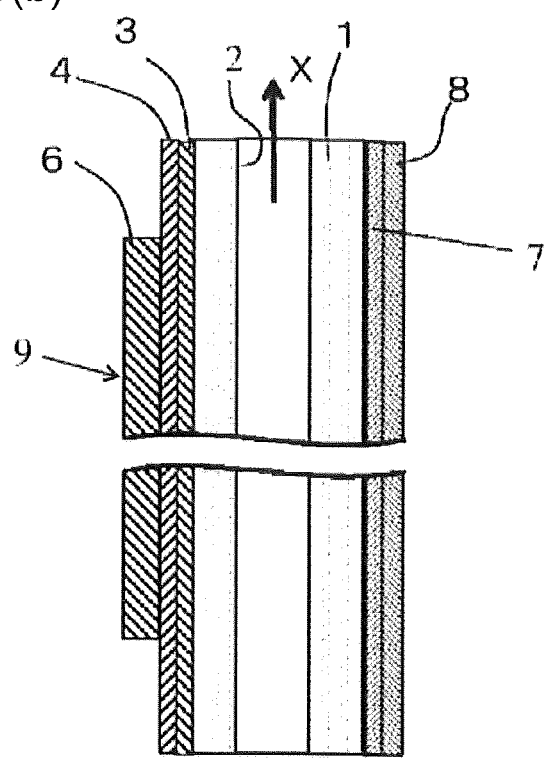

FIG. 1(a) is a horizontal sectional view illustrating a configuration of a solid oxide fuel cell (hereinafter simply referred to as "fuel cell" in some cases) according to the present invention. FIG. 1(b) is a vertical sectional view of the fuel cell shown in FIG. 1(a). In both the drawings, components of the fuel cell 10 are shown in a partly enlarged manner.

The fuel cell 10 is a hollow flat type of fuel cell 10 and includes a porous electrically conductive support 1 (hereinafter referred to as "support" in some cases) which is flat in cross section, which has an elliptic cylindrical shape as a whole, and which contains Ni. A plurality of fuel gas channels 2 are arranged in an internal portion of the electrically conductive support 1 at appropriate intervals so as to longitudinally extend through the electrically conductive support 1. The fuel cell 10 has a configuration in which the electrically conductive support 1 is overlaid with various members.

The electrically conductive support 1 has a pair of flat surfaces n parallel to each other and curved surfaces (side surfaces) m connecting the flat surfaces n as understood from the shape shown in FIG. 1(a). Both the flat surfaces n are substantially parallel to each other. A porous fuel electrode layer 3 is placed so as to cover one of the flat surfaces n (lower surface) and the curved surfaces m located on both sides thereof. Furthermore, a dense solid electrolyte layer 4 is placed so as to cover the fuel electrode layer 3.

A porous oxygen electrode layer 6 is placed on the solid electrolyte layer 4 so as to face the fuel electrode layer 3. Furthermore, an interconnector 8 is placed above the other flat surface n (upper surface) that is free from the fuel electrode layer 3 and the solid electrolyte layer 4, with an intermediate layer 7 located therebetween.

In other words, the interconnector 8 and the solid electrolyte layer 4 form a cylindrical body, the electrically conductive support 1 and the oxygen electrode layer 6 are placed in the cylindrical body, the fuel gas channels 2 extend through the electrically conductive support 1 in the opening direction of the cylindrical body (in the longitudinal direction of the electrically conductive support 1). Furthermore, in other words, one of the flat surfaces of the electrically conductive support 1 is overlaid with a power-generating element unit 9 in which the fuel electrode layer 3 and the oxygen electrode layer 6 are arranged on both sides of the solid electrolyte layer 4 and the other flat surface is overlaid with the intermediate layer 7 and the interconnector 8. The interconnector 8 is electrically connected to the fuel electrode layer 3 of the power-generating element unit 9, which is placed on one of the flat surfaces of the electrically conductive support 1, through the intermediate layer 7 and the electrically conductive support 1.

The fuel electrode layer 3 and the solid electrolyte layer 4 extend from the curved surfaces m of both ends of the electrically conductive support 1 to the other flat surface n (upper surface), are connected such that both ends of the solid electrolyte layer 4 are located at both ends of the interconnector 8, and are configured such that the electrically conductive support 1 is surrounded by the solid electrolyte layer 4 and the interconnector 8 and a fuel gas flowing therein does not leak out.

In this configuration, as shown in FIG. 2, holes 14 present in the thickness direction of the solid electrolyte layer 4 are blocked with a sealant 15. That is, the holes 14 extend through the solid electrolyte layer 4 in the thickness direction thereof. The holes 14 are caused by, for example, dust attached to an unfired green sheet, an agglomerated powder of raw materials, the faulty formation of a green sheet, or the like.

Figure 2A:
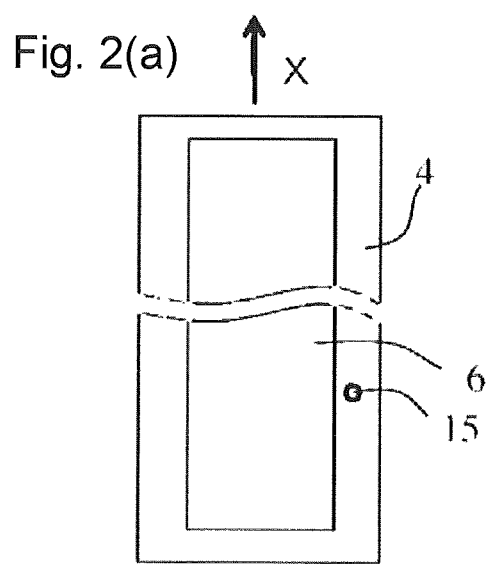
FIG. 2(a) is a side view of the solid oxide fuel cell shown in FIG. 1.
Figure 2A:
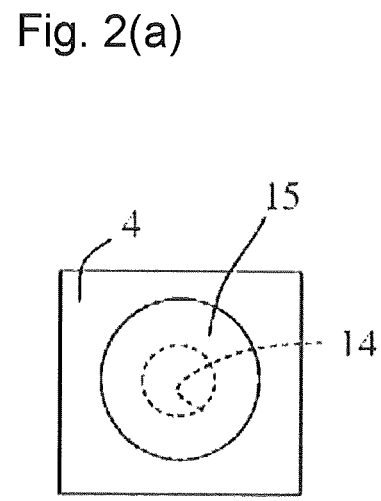
Figure 2C:
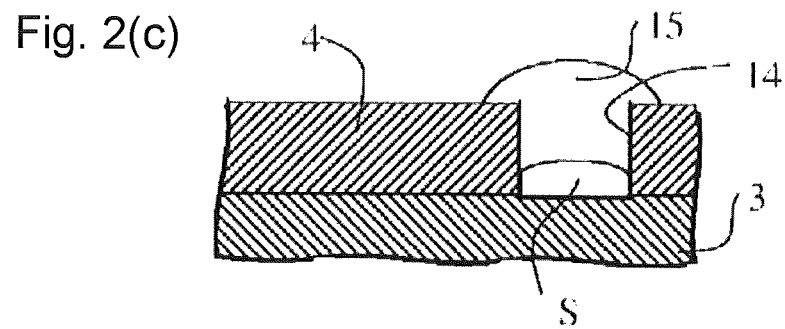
FIG. 2(c) is a partly enlarged sectional view illustrating a state in which holes present in a solid electrolyte layer shown in FIG. 2(a) are blocked with a sealant.

There is not only the case where the holes 14 are formed in the thickness direction of the solid electrolyte layer 4 as shown in FIG. 2(c) but also the case where the holes 14 are formed diagonally to the thickness direction thereof at a certain angle. In addition, there is not only the case where the hole connect principal surfaces of the solid electrolyte layer 4 as shown in FIG. 2(c) but also the case where the holes 14 are formed so as to connect one of the principal surfaces of the solid electrolyte layer 4 to an end surface (side surface) thereof. Furthermore, there is not only the case where the holes 14 are linearly formed so as to extend through the solid electrolyte layer 4 as shown in FIG. 2(c) but also the case where the holes 14 are crookedly formed. In the interconnector 8, as well as the solid electrolyte layer 4, holes, which are not shown in FIG. 2, are caused by the above reason.

In order to eliminate the holes 14, the agglomeration of the raw materials needs to be prevented, the raw materials need to be controlled by reducing dust and impurities, and, furthermore, manufacturing steps need to be strictly controlled. Since the solid electrolyte layer 4 and the interconnector 8 need to prevent the leakage of gas, strict control is conventionally performed as described above and the solid electrolyte layer 4 and the interconnector 8 are prepared so as not to have the holes 14. However, there is a problem in that time, manpower, and cost are needed.

The less the thickness of the solid electrolyte layer 4 is, the more the power generation performance is increased. Therefore, in the case of reducing the thickness of the solid electrolyte layer 4 in order to increase the power generation performance, the holes 14 are likely to be formed. Hence, raw materials of the solid electrolyte layer 4, manufacturing steps, and the like need to be strictly controlled. Likewise, the less the thickness of the interconnector 8 is, the more the electrical conductivity is increased. Therefore, in the case of reducing the thickness of the interconnector 8 in order to increase the electrical conductivity, the holes 14 are likely to be formed. Hence, raw materials of the interconnector 8, manufacturing steps, and the like, need to be strictly controlled.

The holes 14 in the solid electrolyte layer 4 or the interconnector 8 may have an average diameter of 1 mm or less in an embodiment. In another embodiment, the average diameter may be 10 µm to 1 mm. Yet further in an embodiment, the average diameter may be 50 µm to 500 µm. The average diameter of the holes 14 can be determined from a scanning electron micrograph (SEM) of a portion of each hole 14. When the solid electrolyte layer 4 of the fuel cell has one of the holes 14 only, the diameter of this hole corresponds to the average diameter. This applies to the holes 14 in the interconnector 8.

In this configuration, the holes 14 in the solid electrolyte layer 4 are blocked with the sealant 15. Therefore, even if manufacturing conditions are somewhat widely set and the holes 14 formed in the solid electrolyte layer 4 so as to extend through the solid electrolyte layer 4 in the thickness direction thereof, the denseness of the solid electrolyte layer 4 can be ensured and the fuel gas can be readily prevented from leaking out by blocking the holes 14 with the sealant 15. Thus, manpower, time, and cost for manufacture can be reduced. This applies to the holes in the interconnector 8.

Herein, the sealant 15 is preferably composed of glass. When the sealant 15 is composed of glass, the fluidity thereof is high during heat treatment and the holes 14 can be sealed at low temperature. Ba glass, Si glass, B glass, or the like can be used as glass. In particular, crystallized glass which is crystallized after heat treatment is preferred. This is because crystallized glass less causes grains making up the fuel electrode layer 3 to be grown as compared to amorphous glass.

The sealant 15 used to block the holes 14 in the solid electrolyte layer 4 or the interconnector 8 may contain a material for forming each layer having the holes 14. For example, the sealant 15 used to block the holes 14 in the solid electrolyte layer 4 may contain a solid electrolyte material. This has no influence on the solid electrolyte layer 4 or interconnector 8 around the sealant 15.

The material (a material for the sealant 15) for forming each layer having the holes 14 preferably uses a fine power rather than a source powder of a material for forming the solid electrolyte layer 4. This allows the solid electrolyte material and an interconnector material serving as the sealant 15 to be fired at a temperature lower than the firing temperature of the solid electrolyte layer 4 and the interconnector 8 after the solid electrolyte layer 4 and the interconnector 8 are fired.

When the sealant 15 is composed of glass, it is preferred that the sealant 15 is present in the holes 14 in the solid electrolyte layer 4 and is present on a surface of the solid electrolyte layer 4 around the holes 14 and a space S is formed between the fuel electrode layer 3 and the sealant 15 as shown in FIGS. 2(b) and 2(c). This prevents the sealant 15 from directly contacting the fuel electrode layer 3 and prevents the growth of the grains making up the fuel electrode layer 3. FIG. 2(a) is a side view of FIG. 1(b) viewed from the left-hand side of the plane.

Figure 2D:
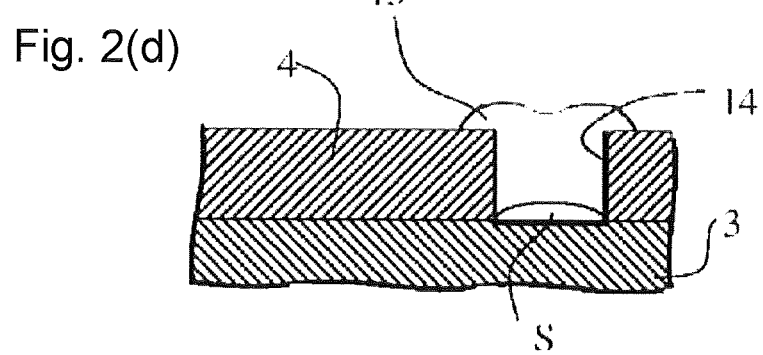
FIG. 2(d) is a sectional view illustrating a state in which the top of the sealant is concave.

The upper surface of the sealant 15 is preferably flat or concave as shown in FIG. 2(d). FIG. 2(d) shows a state in which the upper surface of the sealant 15 is concave. That is, the sealant 15 protrudes from the solid electrolyte layer 4 and a surface of the interconnector 8 and the top thereof is flat or concave. This allows irregularities of the oxygen electrode layer 6, which is placed on the solid electrolyte layer 4, to be reduced. In addition, irregularities of an electrically conductive adhesive placed on the interconnector 8 can be reduced.

(Support 1)

The support 1 needs to be gas-permeable in order to feed the fuel gas to the fuel electrode layer 3 and also needs to be electrically conductive in order to collect power. In order to meet these requirements and in order to avoid failures due to co-firing, the support 1 is preferably composed of an iron-group metal component and a rare-earth oxide. The support 1 is not particularly limited to this and may be composed of an electrically conductive material.

The iron-group metal component is one for imparting electrical conductivity to the support 1 and may be a single iron-group metal, an oxide of the iron-group metal, an alloy of the iron-group metal, or an alloy oxide of the iron-group metal. Examples of the iron-group metal include Fe, Ni, and Co. In this configuration, any of the metals can be used. Ni and/or NiO is preferably contained as the iron-group metal component because Ni and NiO are inexpensive and are stable in the fuel gas.

A rare-earth oxide component is one used to approximate the thermal expansion coefficient of the support 1 to the thermal expansion coefficient of the solid electrolyte layer 4. In order to maintain high electrical conductivity and in order to prevent the diffusion of an element in the solid electrolyte layer 4 or the like, a rare-earth oxide containing at least one rare-earth element selected from the group consisting of Y, Lu, Yb, Tm, Er, Ho, Dy, Gd, Sm, and Pr is preferably used in combination with the iron-group metal component. As the rare-earth oxide, the following oxides can be exemplified: $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. In particular, $Y_2O_3$ and $Yb_2O_3$ are preferred from the viewpoint of inexpensiveness.

These rare-earth oxides hardly form solid solutions with or react with iron-group metals or oxides thereof during firing or power generation. Furthermore, the iron-group metal in the support 1, an oxide thereof, and the rare-earth oxides are unlikely to diffuse. In the case where the support 1 and the solid electrolyte layer 4 are co-fired, the diffusion of rare-earth elements into the solid electrolyte layer 4 is reduced and adverse influences on the ionic conductivity of the solid electrolyte layer 4 can be avoided.

In particular, the support 1 preferably contains 35% to 70% by volume of the iron-group metal component and 30% to 65% by volume of the rare-earth oxide from the viewpoint that the thermal expansion coefficient of the support 1 is approximated to the thermal expansion coefficient of the solid electrolyte layer 4. The support 1 may contain another metal component or an oxide component as long as required properties are not impaired.

Since the support 1, which is composed of the iron-group metal component and the rare-earth oxide, needs to have fuel gas permeability, the open porosity thereof is usually 30% or more and particularly preferably ranges from 35% to 50%. The electrical conductivity of the support 1 is preferably 300 S/cm or more and particularly preferably 440 S/cm or more.

The flat surfaces n of the support 1 usually have a length of 15 mm to 35 mm. The height of the support 1 is appropriately set depending on applications and is set to a range of about 100 mm to 200 mm for home power generation use. Furthermore, the curved surfaces m are connected to both ends of each flat surface n in order to prevent the chipping of a corner section and in order to enhance the mechanical strength. In order to effectively prevent the peeling of the solid electrolyte layer 4, the thickness (the distance between the two flat surfaces n) of the support 1 preferably ranges from 2 mm to 10 mm.

(Fuel Electrode Layer 3)

The fuel electrode layer 3 is one causing an electrode reaction and is composed of known porous cermet. The fuel electrode layer 3 is composed of, for example, $ZrO_2$ or $CeO_2$ containing a rare-earth element in the form of a solid solution and one or both of Ni and NiO.

The content of $ZrO_2$ or $CeO_2$ in the fuel electrode layer 3 preferably ranges from 35% to 65% by volume. The content of Ni or NiO therein preferably ranges from 35% to 65% by volume. The open porosity of the fuel electrode layer 3 is preferably 15% or more and particularly preferably ranges from 20% to 40%. In order to prevent a reduction in performance and peeling due to a difference in thermal expansion coefficient, the fuel electrode layer 3 preferably has a thickness of 1 μm to 30 μm.

In addition, those described in relation to the rare-earth oxide used in the support 1 can be similarly exemplified as the rare-earth element (a rare-earth element other than Ce in the case of $CeO_2$) contained in $ZrO_2$ or $CeO_2$ in the form of a solid solution. From the viewpoint of reducing the polarizability of the cell, it is preferred that $ZrO_2$ contains about three mole percent to ten mole percent Y in the form of a solid solution or $CeO_2$ contains about five mole percent to 20 mole percent Sm in the form of a solid solution.

The fuel electrode layer 3 may be present in a position opposite to the oxygen electrode layer 6 at least. That is, in an example shown in FIG. 1, the fuel electrode layer 3 extends from one of the flat surfaces n of the support 1 to the other one and also extends to both ends of the interconnector 8. The fuel electrode layer 3 may be placed on one of the flat surfaces n only.

A diffusion-suppressing layer, which is not shown, may be provided on the fuel electrode layer 3 as required such that the diffusion-suppressing layer is located between the fuel electrode layer 3 and the solid electrolyte layer 4. The diffusion-suppressing layer is one for suppressing the diffusion of elements from the fuel electrode layer 3 or the support 1 into the solid electrolyte layer 4 to avoid a reduction in performance due to the formation of an insulating layer and is composed of $CeO_2$ containing La in the form of a solid solution, $La_2O_3$ containing Ce in the form of a solid solution, or a mixture thereof. In order to increase the effect of blocking or suppressing the diffusion of elements, the diffusion-suppressing layer may contain another rare-earth element. As this rare-earth element, the following elements can be exemplified: Sc, Y, Pr, Nd, Pm, Sm, Eu, Gd, Tb, Dy, Ho, Er, Tm, Yb, and Lu.

In addition, the diffusion-suppressing layer preferably extends to both ends of the interconnector 8 together with the solid electrolyte layer 4. This is because the diffusion of elements from the support 1 or the fuel electrode layer 3 into the solid electrolyte layer 4 can be prevented.

(Solid Electrolyte Layer 4)

The solid electrolyte layer 4 needs to have a function as an electrolyte passing electrons between electrodes and also needs to have gas barrier properties for the purpose of preventing the leakage of the fuel gas and an oxygen-containing gas such as air. Thus, a material used to form the solid electrolyte layer 4 is preferably, for example, a dense oxide ceramic, such as stabilized zirconia ($ZrO_2$) containing three mole percent to 15 mole percent of a rare-earth element in the form of a solid solution, having such properties. As the rare-earth element in the stabilized zirconia ($ZrO_2$), the following elements can be exemplified: Sc, Y, La, Ce, Pr, Nd, Pm, Sm, Eu, Gd, Tb, Dy, Ho, Er, Tm, Yb, and Lu. From the viewpoint of inexpensiveness, Y and Yb are preferred.

Furthermore, a perovskite-type lanthanum gallate-based composite oxide containing La and Ga can be used a solid electrolyte. This composite oxide has high ionic conductivity. High power generation efficiency can be achieved using this composite oxide as a solid electrolyte. This lanthanum gallate-based composite oxide contains La at an A-site, Sr at an A-site, Ga at a B-site, and Mg at a B-site and preferably has a composition represented by, for example, the following general formula: $(La_{1-x}Sr_x)(Ga_{1-y}Mg_y)O_3$ (where x is a number satisfying $0<x<0.3$ and y is a number satisfying $0<y<0.3$). High power generation performance can be exhibited using a composite oxide having such a composition as a solid electrolyte.

The solid electrolyte layer 4 preferably has a relative density (by the Archimedes method) of 93% or more and particularly preferably 95% or more from the viewpoint of preventing the permeation of gas. The solid electrolyte layer 4 preferably has an average thickness of 5 μm to 40 μm in order to increase power generation performance. In the present invention, particularly in the case of setting the average thickness of the solid electrolyte layer 4 to be small, 5 μm to 20 μm, in order to increase power generation performance, holes are likely to be formed. Therefore, the above configuration can be used well.

(Oxygen Electrode Layer 6)

The oxygen electrode layer 6, which is placed on the solid electrolyte layer 4, is one causing the electrode reaction as described above and is located in a position opposite to the fuel electrode layer 3 with the solid electrolyte layer 4 therebetween as shown in FIG. 1. That is, the oxygen electrode layer 6 is placed on a portion located on at least one of the flat surfaces n of the support 1.

The oxygen electrode layer 6 is composed of sintered particles of a so-called $ABO_3$-type perovskite oxide. The perovskite oxide is preferably a transition metal-type perovskite oxide and particularly preferably at least one of a $LaMnO_3$-based oxide, $LaFeO_3$-based oxide, and $LaCoO_3$-based oxide containing La at an A-site. In particular, from the viewpoint of exhibiting high electrical conductivity at a relatively low temperature of about 600° C. to 1,000° C. and the viewpoint of exerting a good surface diffusion function and volume diffusion function on oxygen atoms, the following oxide is preferred: a composite oxide, such as a (La, Sr)(Co, Fe)$O_3$-based oxide (hereinafter referred to as "La—Sr—Co-based composite oxide" in some cases), having a composition represented by, for example, the general formula $La_ySr_{1-y}Co_zFe_{1-z}O_3$ (where y is a number satisfying $0.5 \leq y \leq 0.7$ and z is a number satisfying $0.2 \leq z \leq 0.8$).

The oxygen electrode layer 6 must have gas permeability. Thus, the electrically conductive ceramic preferably has an open porosity of 20% or more and particularly preferably ranges from 30% to 50%. The oxygen electrode layer 6 preferably has a thickness of 30 μm to 100 μm from the viewpoint of power-collecting performance.

The oxygen electrode layer 6 may be formed on the solid electrolyte layer 4. However, a reaction-preventing layer, which is not shown, may be provided on the solid electrolyte layer 4 as required and the oxygen electrode layer 6 may be deposited above the solid electrolyte layer 4 with the reaction-preventing layer therebetween. The reaction-preventing layer is one for blocking the diffusion of elements from the oxygen electrode layer 6 into the solid electrolyte layer 4 and is composed of a sintered body of an oxide having an element diffusion-preventing function. For example, an oxide containing Ce as a constituent element can be exemplified as such an oxide for preventing reactions. In particular, a Ce composite oxide in which an oxide of a rare-earth element other than Ce is present in $CeO_2$ in the form of a solid solution is preferably used because the Ce composite oxide has good oxygen ion conductivity and electronic conductivity in addition to high element diffusion-blocking performance.

(Interconnector 8)

The interconnector 8, which is placed on the flat surfaces n of the support 1, is composed of an electrically conductive ceramic and needs to have reduction resistance and oxidation resistance because the interconnector 8 contacts the fuel gas (hydrogen) and the oxygen-containing gas. Therefore, in general, a lanthanum chromate-based perovskite oxide ($LaCrO_3$-based oxide) is used as such an electrically conductive ceramic. The interconnector 8 is not particularly limited and may be composed of, for example, a Ti-containing perovskite composite oxide such as a perovskite composite oxide containing La, Sr, and Ti. In order to prevent the leakage of the fuel gas flowing in the support 1 and the oxygen-containing gas flowing outside the support 1, the electrically conductive ceramic needs to be dense and preferably has a relative density of, for example, 93% or more and particularly preferably 95% or more.

The interconnector 8 preferably has an average thickness of 10 μm to 200 μm from the viewpoint of preventing the leakage of gas and the viewpoint of electrical resistance. The interconnector 8 preferably has a smaller thickness because of an increase in electrical conductivity. When the average thickness thereof is small, 10 μm to 40 μm, the holes 14 are likely to be formed. Therefore, this configuration can be preferably used.

(Manufacture of Fuel Cell)

The fuel cell, which has the above structure, can be manufactured by a known process. In particular, a co-firing process below is preferably used. A manufacturing method is described below using the fuel cell, which has the structure shown in FIGS. 1 and 2, as an example.

Ceramic clay is prepared in such a way that, for example, a powder mixture for forming the electrically conductive support 1 is mixed with an organic binder, a solvent, and a dispersant as required. The ceramic clay is extruded, whereby an electrically conductive support-purpose form which comprises fuel gas channels and which is columnar is prepared. This is dried and is calcined at a temperature of 800° C. to 1,100° C.

The powder mixture used to prepare the electrically conductive support-purpose form is one obtained by mixing, for example, a powder of an iron-group metal or an iron-group metal oxide and a powder of a rare-earth oxide at a predetermined volume ratio.

A sheet (hereinafter referred to as "solid electrolyte layer-purpose sheet") for the solid electrolyte layer is prepared. That is, for example, a powder of a solid electrolyte such as Y-containing $ZrO_2$ (YSZ) is mixed with an organic binder and a solvent, whereby slurry is prepared. The solid electrolyte layer-purpose sheet is formed by a doctor blade process or the like using the slurry.

Next, a fuel electrode layer-purpose sheet is prepared by a doctor blade process or the like using slurry prepared by mixing a powder (for example, a powder mixture of a NiO powder and a YSZ powder) for forming the fuel electrode layer. The fuel electrode layer-purpose sheet is deposited on a surface of the solid electrolyte layer-purpose sheet. This is wound around a predetermined position of the form (calcined body) for the support such that the fuel electrode layer-purpose sheet is located inside and is then dried.

Thereafter, for example, a powder, such as a $LaCrO_3$-based material, for the interconnector is mixed with an organic binder and a solvent, whereby slurry is prepared. An interconnector-purpose sheet is prepared by a doctor blade process or the like using this slurry.

Next, an intermediate layer-purpose sheet is prepared by a doctor blade process or the like using slurry prepared by mixing a powder (for example, a powder mixture of a NiO powder and a YSZ powder) for forming the intermediate layer. The intermediate layer-purpose sheet is deposited on a surface of the interconnector-purpose sheet. The interconnector-purpose sheet having the intermediate layer-purpose sheet thereon is deposited on a surface of the electrically conductive support-purpose form, the surface having no solid electrolyte layer-purpose sheet, such that the intermediate layer-purpose sheet is located on the side of the electrically conductive support-purpose form and is then dried.

Next, after being heat-treated for degreasing, the laminate was co-fired at a temperature of 1,300° C. to 1,600° C. in an oxygen-containing atmosphere such as air. This is capable of obtaining a sintered body in which the fuel electrode layer 3 and the solid electrolyte layer 4 are deposited on the electrically conductive support 1, in which the intermediate layer 7 and the interconnector 8 are deposited on a predetermined position, and which includes the element diffusion-preventing layer or the reaction-preventing layer as required.

Thereafter, the solid electrolyte layer 4 and the interconnector 8 are checked whether the holes 14 are present or not. That is, a gas leakage test is carried out. This confirms whether the holes 14 are present in the solid electrolyte layer 4 or the interconnector 8 or not as follows: the sintered body is immersed in water in such a state that one end of each fuel gas channel 2 in the sintered body is blocked; gas such as a He gas is supplied to the other end of fuel gas channel 2 in the electrically conductive support 1 at a predetermined pressure of, for example, 3 kg/cm$^2$; and whether bubbles are generated or not is checked. In the case where the holes 14 are present, after portions generating bubbles are marked and the sintered body is dried, for example, a glass paste prepared by mixing an organic material with a glass material containing Ba, Si, Zr, Al, and the like is applied to portions near the holes 14 and is injected into the holes 14. In order to form the space S as shown in FIG. 2(c), the viscosity of the glass paste may be set to a high level. Thereafter, heat treatment is performed at a temperature lower than the co-firing temperature.

The heat treatment temperature and time of the glass paste depend on the glass material used and are, for example, 1,000° C. to 1,300° C. and 0.5 hours to ten hours, respectively.

The top of the sealant 15 may be planarized or recessed as shown in FIG. 2(d) by controlling a material for the sealant 15 in the holes 14, the heat treatment temperature, and the treatment time. In this case, the swelling of the oxygen electrode layer 6 on the upper surface of the sealant 15 can be reduced even in the case of forming the oxygen electrode layer 6 on the upper surface of the sealant 15. In order to planarize or recess the top of the sealant 15, a material with a softening point lower than that of the glass material shown in FIG. 2(c) is used, the heat treatment temperature is raised, or the heat treatment time is increased.

Furthermore, a coating layer for the oxygen electrode layer is formed on the solid electrolyte layer 4 of the sintered body obtained as described above by spraying (immersing, or applying) a coating solution, prepared by dispersing a $LaFeO_3$-based oxide powder or the like in a solvent, for the oxygen electrode layer on the solid electrolyte layer 4 and is then baked at a temperature of 1,000° C. to 1,300° C., whereby the fuel cell, which includes the oxygen electrode layer 6, can be obtained. In the obtained fuel cell, a conductor component contained in the support 1 is present in the form of an oxide such as NiO because of firing in the oxygen-containing atmosphere. Such an oxide is reduced by reduction treatment supplied with the fuel gas or power generation.

In the above configuration, the solid electrolyte layer 4 and the interconnector 8 have the holes 14 and the holes 14 are blocked with the sealant 15 as described above. One of the solid electrolyte layer 4 and the interconnector 8 may have the holes 14.

Figure 3A:
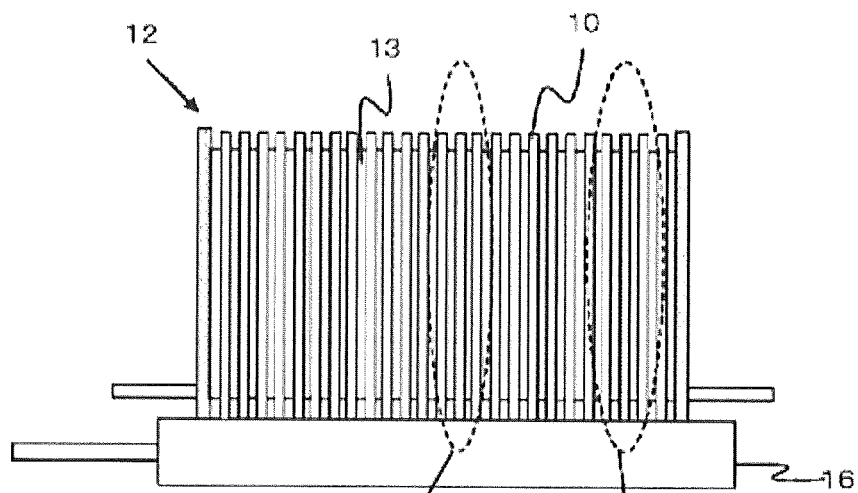
FIG. 3(a) is a schematic side view illustrating a configuration of a fuel cell stack device and FIG. 3(b) is a partly enlarged sectional view illustrating portions of the fuel cell stack device shown in FIG. (a), the portions being each surrounded by a broken line.
Figure 3B:
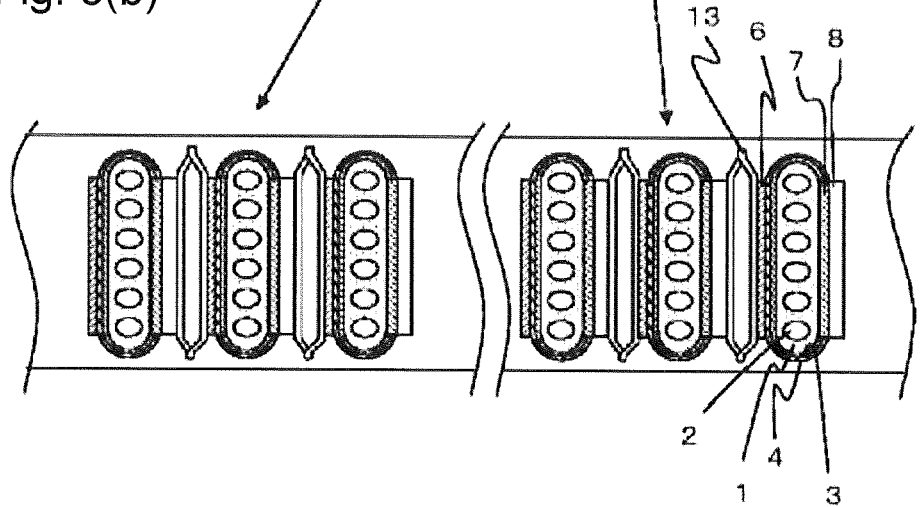

FIG. 3 shows a configuration of a fuel cell stack device configured by connecting a plurality of fuel cells 10, each comprising the above-mentioned fuel cell, in series through current collector members 13. FIG. 3(a) is a schematic side view of the fuel cell stack device 11. FIG. 3(b) is a partly enlarged sectional view of the fuel cell stack device 11 shown in FIG. 3(a) and selectively shows portions corresponding to portions each surrounded by a broken line in FIG. 3(a). In FIG. 3(b), the portions corresponding to the portions surrounded by the broken lines in FIG. 3(a) are indicated by arrows for the purpose of clarity.

Figure 4:
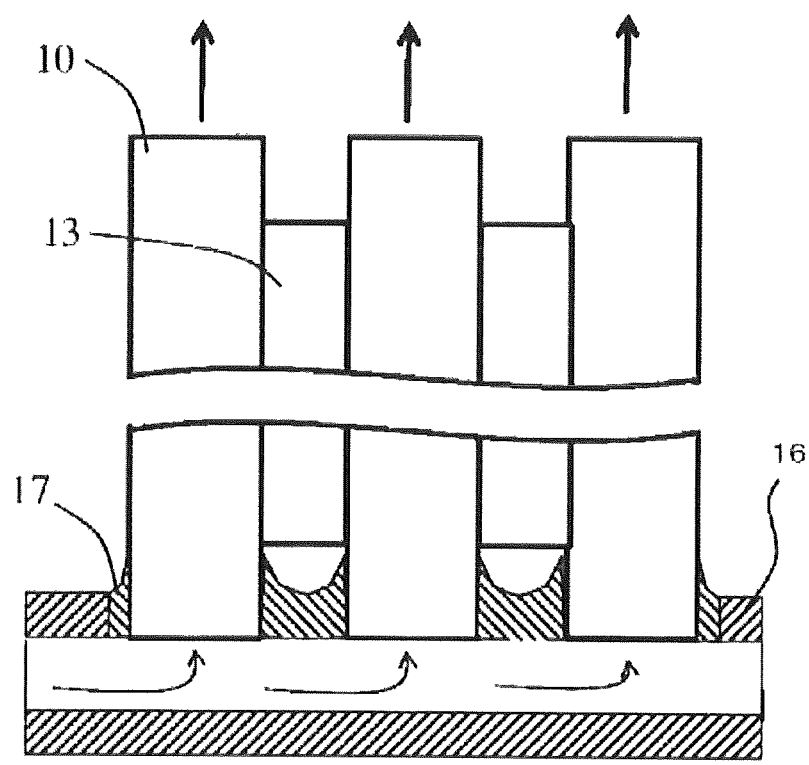
FIG. 4 is a sectional view of a portion of the fuel cell stack device shown in FIG. 3.

In the fuel cell stack device 11, the fuel cells 10 are arranged between the current collector members 13. The fuel cells 10 are bonded to the current collector members 13 with an electrically conductive adhesive, whereby each fuel cell stack 12 is configured. As shown in FIG. 4, a lower end portion of each fuel cell 10 is fixed to an upper wall of a gas tank 16, composed of a refractory alloy, for supplying the fuel gas to the fuel cell 10 with a bonding material 17. That is, a through-hole in which a lower end portion of the fuel cell stack 12 is inserted is present in the upper wall of the gas tank 16. The lower end portion of the fuel cell stack 12 is fixed with the bonding material 17, such as glass or a glass ceramic, in such a state that the lower end portion of the fuel cell stack 12 is placed in the through-hole.

In the fuel cell stack device 11 of this configuration, the fuel cell stack 12 is configured using the fuel cells 10. Therefore, the fuel cell stack device 11 is allowed to have increased long-term reliability.

Figure 5:
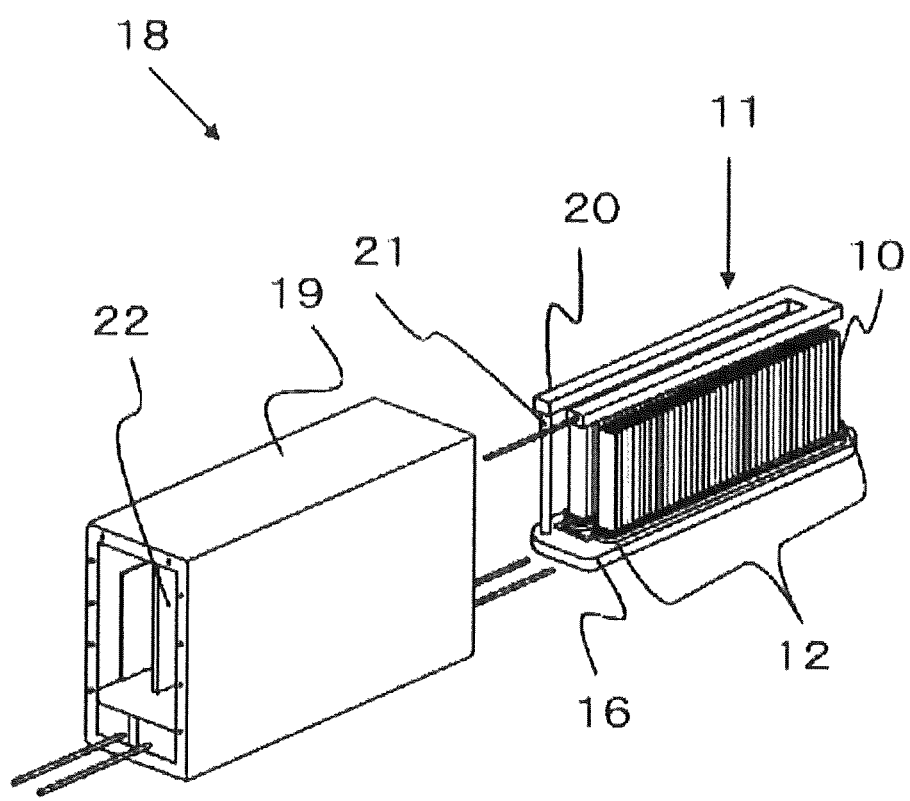
FIG. 5 is an outline perspective view illustrating a configuration of a fuel cell module.

FIG. 5 is an outline perspective view illustrating a configuration of a fuel cell module 18 including a storage vessel 19 and the fuel cell stack device 11 housed therein. The fuel cell module 18 is configured by placing the fuel cell stack device 11, which is shown in FIG. 3, in the storage vessel 19, which has a rectangular parallelepiped shape.

A reformer 20 for producing the fuel gas by reforming natural gas, kerosene, or the like is placed above the fuel cell stack 12 for the purpose of obtaining the fuel gas, which is used in the fuel cells 10. The fuel gas is produced in the reformer 20, is supplied to the gas tank 16 through a gas conduit 21, and is supplied to the fuel gas channels 2, which are arranged in the fuel cells 10, from the gas tank 16.

FIG. 5 shows a state in which portions (front and back faces) of the storage vessel 19 are removed and the fuel cell stack device 11 and reformer 20 housed therein are withdrawn backward. In the fuel cell module 18, which is shown in FIG. 5, the fuel cell stack device 11 can be housed in the storage vessel 19 by sliding the fuel cell stack device 11. The fuel cell stack device 11 may include the reformer 20.

An oxygen-containing gas-introducing member 22 placed in the storage vessel 19 is located between the fuel cell stacks 12 apposed in the gas tank 16 as shown in FIG. 5 and supplies the oxygen-containing gas to the lower end portion of each fuel cell 10 such that the oxygen-containing gas flows from the lower end portion toward an upper end portion of the fuel cell 10 along the fuel cell 10 synchronously with the flow of the fuel gas.

The temperature of the fuel cell 10 can be increased and the fuel cell stack device 11 can be quickly started up in such a way that the fuel gas discharged from the fuel gas channels 2 of the fuel cell 10 is allowed to react with the oxygen-containing gas and is combusted on the upper end side of the fuel cell 10. Since the fuel gas discharged from the fuel gas channels 2 of the fuel cell 10 is combusted on the upper end side of the fuel cell 10 using the oxygen-containing gas, the reformer 20, which is placed above the fuel cell 10 (the fuel cell stacks 12), can be heated. This allows a reforming reaction to be efficiently carried out in the reformer 20.

In the fuel cell module 18 of this configuration, the fuel cell stack device 11 is housed in the storage vessel 19. Therefore, the fuel cell module 18 is allowed to have increased long-term reliability.

Figure 6:
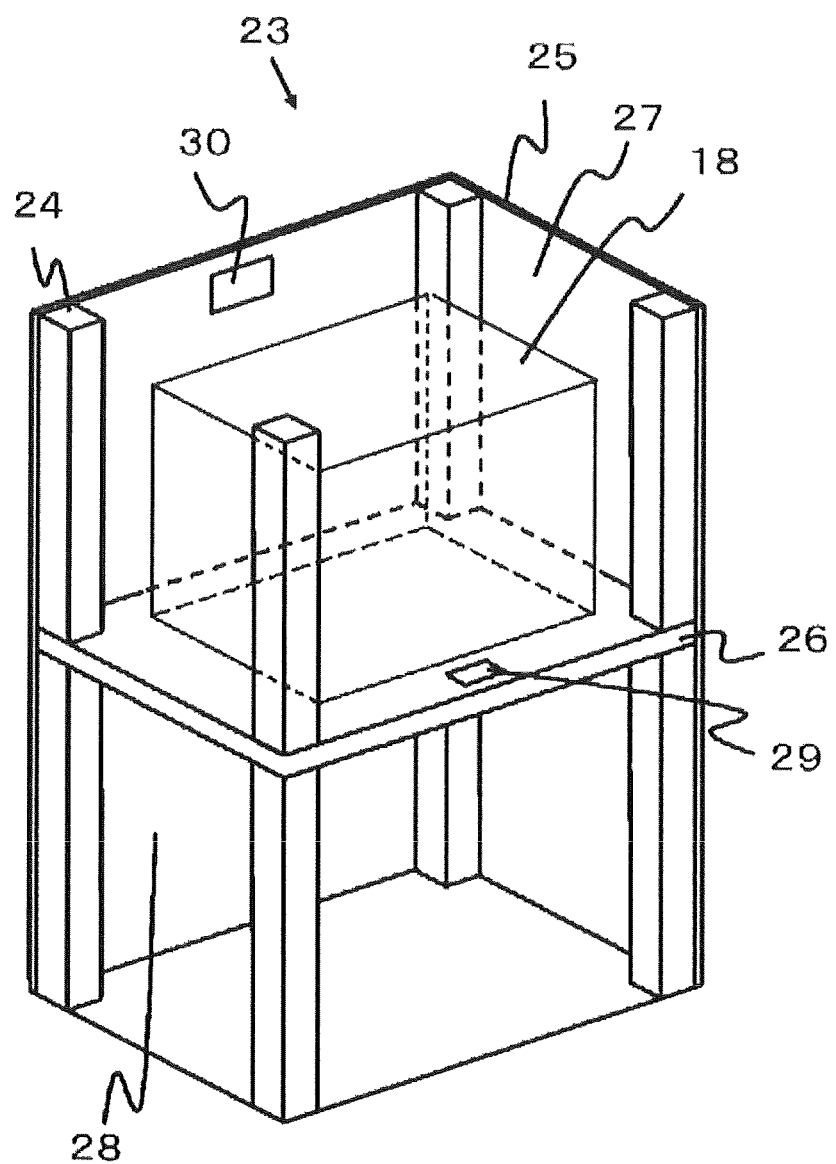
FIG. 6 is an exploded perspective view illustrating a configuration of a fuel cell apparatus.

FIG. 6 is an exploded perspective view illustrating a configuration of a fuel cell apparatus in which the fuel cell module 18 shown in FIG. 5 and an auxiliary device for operating the fuel cell stack device 11 are housed in a cover case. In FIG. 6, some components are simply shown.

The fuel cell apparatus 23 shown in FIG. 6 is configured as follows: the cover case is composed of pillars 24 and a cover plate 25 and is vertically partitioned with a partition 26, the upper side thereof corresponds to a module storage chamber 27 for storing the fuel cell module 18, and the lower side thereof corresponds to an auxiliary device storage chamber 28 for storing an auxiliary device for operating the fuel cell module 18. In FIG. 6, the auxiliary device housed in the auxiliary device storage chamber 28 is omitted. The auxiliary device includes at least a blower for supplying the oxygen-containing gas and a pump for supplying the fuel gas.

The partition 26 is provided with an air vent 29 for feeding air in the auxiliary device storage chamber 28 to the module storage chamber 27. The cover plate 25 is provided with an air outlet 30 for discharging air in the module storage chamber 27.

In the fuel cell apparatus 23, the fuel cell module 18, which can increase reliability, is housed in the module storage chamber 27. Therefore, the fuel cell apparatus 23 is allowed to have increased reliability.

The present invention is not limited to the above embodiments. Various modifications and improvements may be made without departing from the scope of the present invention.

The solid oxide fuel cell described in the above embodiment is hollow and flat. The solid oxide fuel cell may be, for example, cylindrical or flat.

The present invention can be applied to a type of cell stack device including, for example, a plurality of flat fuel cells. The fuel cells each include a power-generating element unit including a fuel electrode layer, solid electrolyte layer, and oxygen electrode layer arranged in that order; a fuel-side current collector electrically connected to the fuel electrode layer; and an oxygen-side current collector electrically connected to the oxygen electrode layer and are stacked with interconnectors therebetween. A central portion of the fuel electrode layer and a central portion of the oxygen electrode layer are supplied with a fuel gas and oxygen-containing gas, respectively. These gases flow toward the outside edges of the fuel and oxygen electrode layers. A surplus of the fuel gas and a surplus of the oxygen-containing gas are discharged from the outside edges of the fuel cells.

Figure 7A:
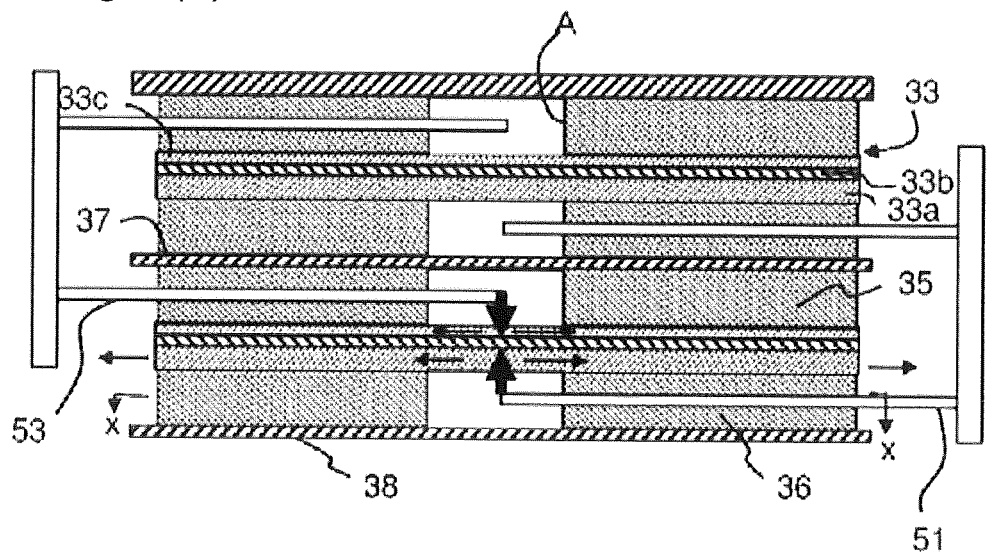
FIG. 7(a) is a sectional view of a flat fuel cell and FIG. 7(b) is a side view thereof.
Figure 7B:
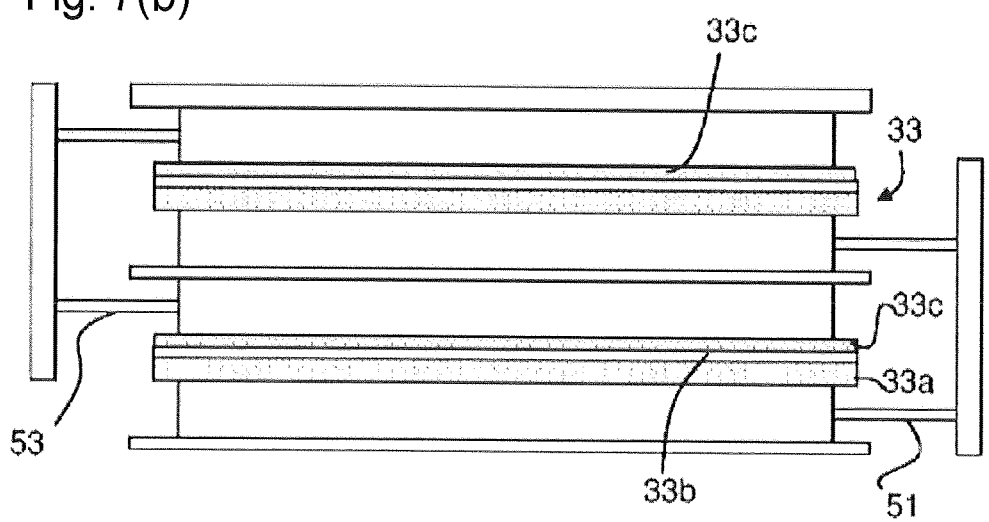
Figure 8:
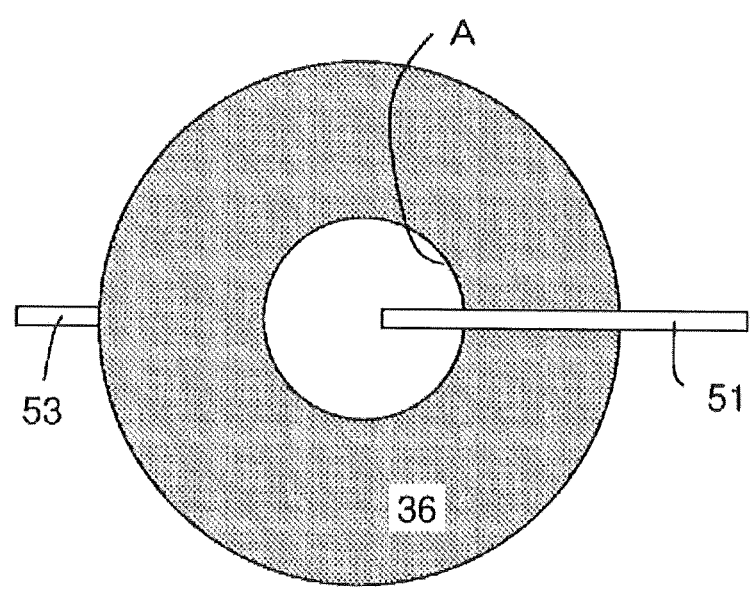
FIG. 8 is a sectional view taken along the line x-x of FIG. 7(a).

That is, the present invention can be applied to a cell stack device including a plurality of fuel cells. As shown in FIGS. 7 and 8, the fuel cells each include a power-generating element unit 33 including a fuel electrode layer 33a, solid electrolyte layer 33b, and oxygen electrode layer 33c arranged in that order; a fuel-side current collector 36 electrically connected to the fuel electrode layer 33a; and an oxygen-side current collector 35 electrically connected to the oxygen electrode layer 33c and are stacked with interconnectors 37 and 38 therebetween. In FIGS. 7 and 8, reference numeral 51 represents fuel gas supply pipes and reference numeral 53 represents oxygen-containing gas supply pipes.

EXAMPLE

First, a NiO powder with an average particle size of 0.5 μm and an $Y_2O_3$ powder with an average particle size of 0.9 μm were mixed together and were further mixed with an organic binder and a solvent, whereby ceramic clay was prepared. The ceramic clay was formed by extrusion molding, was dried, and was then degreased, whereby an electrically conductive support-purpose form was prepared.

Next, a solid electrolyte layer-purpose sheet was prepared by a doctor blade process using slurry obtained by mixing a $ZrO_2$ powder (solid electrolyte powder) containing eight mole percent Y in the form of a solid solution with an organic binder and a solvent, the $ZrO_2$ powder having a particle size of 0.8 μm as determined by a microtrack method.

Next, a fuel electrode layer-purpose slurry was prepared by mixing a NiO powder having an average particle size of 0.5 μm, a $ZrO_2$ powder (YSZ powder) containing $Y_2O_3$ in the form of a solid solution, an organic binder, and a solvent together. A fuel electrode layer-purpose sheet was prepared using the fuel electrode layer-purpose slurry. The fuel electrode layer-purpose sheet was deposited on the solid electrolyte layer-purpose sheet.

A laminate obtained by depositing the fuel electrode layer-purpose sheet on the solid electrolyte layer-purpose sheet was deposited on a predetermined position on the electrically conductive support-purpose form with the fuel electrode layer-purpose sheet facing inward. The laminate was calcined at 1,000° C. for three hours.

Subsequently, slurry was prepared by mixing a $La(Mg_{0.3}Cr_{0.7})_{0.96}O_3$ powder with an organic binder and a solvent. An interconnector-purpose sheet was prepared using this slurry.

An intermediate layer-purpose slurry was prepared by mixing a material containing a NiO powder and a YSZ powder with an organic binder and a solvent. An intermediate layer-purpose sheet was prepared using the prepared intermediate layer-purpose slurry and was then deposited on a site of the electrically conductive support-purpose form, the site being free from the fuel electrode layer-purpose sheet (and the solid electrolyte layer-purpose sheet). The interconnector-purpose sheet was deposited on the intermediate layer-purpose sheet.

Next, the laminate was degreased and was then co-fired at 1,450° C. for two hours in an oxygen-containing atmosphere.

A prepared fuel cell 10 had a width of 25 mm and a length of 200 mm. An electrically conductive support 1 had a thickness (the average thickness between flat surfaces n) of 2 mm and an open porosity of 35%. A fuel electrode layer had an average thickness 10 μm and an open porosity of 24%. A solid electrolyte layer 8 had an average thickness 10 μm. An interconnector had an average thickness 10 μm. In addition, the following cell was prepared: another fuel cell 10 including a solid electrolyte layer 4 having an average thickness 20 μm and an interconnector 8 having an average thickness 40 μm.

The average thickness of the solid electrolyte layer 4 was determined in such a way that the thickness of the solid electrolyte layer 4 at a flat portion of the electrically conductive support 1 was determined from three cross-sectional photographs taken using a scanning electron microscope (SEM) and they were averaged. The average thickness of the interconnector 8 was similarly determined.

The presence of holes 14 in the solid electrolyte layer 4 or the interconnector 8 was checked by a leakage test. The leakage test is one in which one end of each fuel gas channel 2 is sealed with a predetermined member, the fuel cell 10 is put in water, and a He gas pressurized to 3 kg/cm² is supplied from the one end of the fuel gas channel 2 of the fuel cell 10. The leakage test shows that a portion of the fuel cell 10 that generates bubbles has holes. This test confirmed that the solid electrolyte layer 4 and the interconnector 8 had the holes 14.

The average diameter of the holes 14 in the solid electrolyte layer 4 and that of the holes 14 in the interconnector 8 ranged from 100 μm to 500 μm as determined from SEM photographs. The average diameter of the holes 14 was determined as follows: a SEM photograph of a portion having the holes 14 was taken at a magnification of 10,000 times, the area of each holes was determined with an image analyzer, and the diameter thereof was determined from the hole area supposing the form of the hole to be circular.

In portions of the holes 14, paste for a sealant was prepared by mixing a silica-based crystallized glass material with an organic binder and a solvent, was injected into the holes 14 using a discharger (dispenser), and was then heat-treated at 1,150° C. for one hour, whereby the holes 14 was blocked with a sealant 15.

Thereafter, the leakage test was carried out for 60 seconds, whereby the absence of gas leakage was confirmed.

A mixed liquid containing isopropyl alcohol and a $La_{0.6}Sr_{0.4}Co_{0.2}Fe_{0.8}O_3$ powder with an average particle size of 2 μm was prepared and was applied to the solid electrolyte layer 4 of the sintered laminate by spraying, whereby an oxygen electrode layer form was formed. An oxygen electrode layer 6 was formed by baking the oxygen electrode layer form at 1,100° C. for four hours, whereby the fuel cell 10 was prepared. The oxygen electrode layer 6 had a thickness of 50 μm and an open porosity of 40%.

Next, the fuel electrode layer 3 were reduced at 850° C. for ten hours in such a way that a hydrogen gas was fed into the fuel cell 10 and the electrically conductive support, whereby the fuel cell 10 was obtained as shown in FIGS. 1 and 2.

REFERENCE SIGNS LIST

1 Electrically conductive support
2 Fuel gas channels
3 Fuel electrode layer
4 Solid electrolyte layer
6 Oxygen electrode layer
8, 37, 38 Interconnector
9, 33 Power-generating element unit
10 Solid oxide fuel cell
11 Fuel cell stack device
14 Holes
15 Sealant
18 Fuel cell module
23 Fuel cell apparatus

The invention claimed is:
1. A solid oxide fuel cell comprising a power-generating element unit, the power-generating element unit comprising:
a fuel electrode layer; a solid electrolyte layer on the fuel electrode layer, the solid electrolyte layer comprising holes having an average diameter of 1 mm or less, wherein at least one of the holes which extend through in the thickness direction of the solid electrolyte layer, comprises a sealant portion consisting essentially of glass within the at least one hole;
an oxygen electrode layer on the solid electrolyte layer; and
a space between the fuel electrode layer and the sealant.
2. The solid oxide fuel cell according to claim 1, wherein an upper surface of the sealant is flat or concave.

3. The solid oxide fuel cell according to claim 1, wherein the solid electrolyte layer has an average thickness of 5 μm to 20 μm.

4. The solid oxide fuel cell according to claim 1, further comprising an interconnector electrically connected to the fuel electrode layer, wherein the interconnector and the solid electrolyte layer form a cylindrical body and an internal portion of the cylindrical body comprises the fuel electrode layer and fuel gas channels.

5. A solid oxide fuel cell comprising a power-generating element unit, the power-generating element unit comprising:
- a fuel electrode layer; a solid electrolyte layer on the fuel electrode layer;
- an oxygen electrode layer on the solid electrolyte layer; and
- and an interconnector comprising holes having an average diameter of 1 mm or less, wherein the interconnector is electrically connected to the fuel electrode layer or oxygen electrode layer, and at least one of the holes which extend through in the thickness direction of the interconnector, comprises a sealant portion, wherein the sealant consists essentially of glass, within the at least one hole;
- wherein a space exists between the fuel electrode layer and the sealant.

6. The solid oxide fuel cell according to claim 5, wherein the interconnector has an average thickness of 10 μm to 40 μm.

7. A fuel cell stack device, comprising a plurality of the arrayed solid oxide fuel cells according to claim 1, wherein the solid oxide fuel cells are electrically connected to each other.

8. A fuel cell module, comprising the fuel cell stack device according to claim 7 in a storage vessel.

9. A fuel cell apparatus, further comprising
- a cover case;
- the fuel cell module according to claim 8 in the cover case; and
- an auxiliary device in the cover case for operating the fuel cell module.

10. The solid oxide fuel cell according to claim 1, wherein solid electrolyte layer further comprises:
- a first surface contacting the fuel electrode layer;
- a second surface opposite to the first surface, and comprising periphery areas around the holes; and
- sealant layers on each of the periphery areas, each connected to the sealant portion.

11. The solid oxide fuel cell according to claim 5, wherein at least one of the holes extends through the interconnector, along its entire length, from a surface of the interconnector toward an opposite surface thereof.

* * * * *